(12) United States Patent
Jaradi et al.

(10) Patent No.: US 11,981,278 B1
(45) Date of Patent: May 14, 2024

(54) SLIDABLE POST WITH AIRBAG FOR WHEELCHAIR OCCUPANTS

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S.M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/313,429

(22) Filed: May 8, 2023

(51) Int. Cl.
*B60R 21/20* (2011.01)
*B60R 21/015* (2006.01)
*B60R 21/214* (2011.01)
*B60R 21/00* (2006.01)
*B60R 21/01* (2006.01)
*B60R 21/02* (2006.01)
*B62D 25/06* (2006.01)
*B62D 25/20* (2006.01)

(52) U.S. Cl.
CPC ........ *B60R 21/01512* (2014.10); *B60R 21/20* (2013.01); *B60R 21/214* (2013.01); *B60R 2021/006* (2013.01); *B60R 2021/0065* (2013.01); *B60R 2021/01211* (2013.01); *B60R 2021/01286* (2013.01); *B60R 2021/0273* (2013.01); *B62D 25/06* (2013.01); *B62D 25/2009* (2013.01)

(58) Field of Classification Search
CPC .................. B60R 21/214; B60R 2021/0273
See application file for complete search history.

(56) References Cited

U.S. PATENT DOCUMENTS

| | | | |
|---|---|---|---|
| 10,065,592 B2 | 9/2018 | Jaradi et al. | |
| 10,717,358 B2 * | 7/2020 | Patil | B60K 35/28 |
| 10,821,930 B2 * | 11/2020 | Malapati | B60R 21/16 |
| 11,362,872 B2 | 6/2022 | Jaradi et al. | |
| 11,364,872 B1 * | 6/2022 | Jaradi | B60R 21/214 |
| 11,370,382 B2 | 6/2022 | Zhao et al. | |
| 11,535,186 B2 * | 12/2022 | Jaradi | B60R 21/214 |
| 11,577,680 B1 * | 2/2023 | Faruque | B60N 3/002 |

(Continued)

FOREIGN PATENT DOCUMENTS

| | | | | |
|---|---|---|---|---|
| CN | 113147657 A | * | 7/2021 | ........... B60R 21/214 |
| CN | 114103865 A | * | 3/2022 | ........... B60R 21/213 |

(Continued)

*Primary Examiner* — Nicole T Verley
(74) *Attorney, Agent, or Firm* — Frank A. MacKenzie; Bejin Bieneman PLC

(57) ABSTRACT

A vehicle includes a vehicle roof and a vehicle floor spaced downwardly from the vehicle roof. The vehicle includes a post slidably supported by one of the vehicle floor and the vehicle roof and a tether slidably engaged with the other of the vehicle floor and the vehicle roof. The tether extends from the other of the vehicle floor and the vehicle roof toward the post. The post is slidable relative to the vehicle floor and the vehicle roof from a stowed position to a deployed position. The vehicle includes a support member mounted to the post between the vehicle floor and the vehicle roof. The vehicle includes an airbag supported by the support member. The airbag is inflatable to an inflated position when the post is in the deployed position.

20 Claims, 9 Drawing Sheets

(56) References Cited

U.S. PATENT DOCUMENTS

| | | | |
|---|---|---|---|
| 11,590,921 B1* | 2/2023 | Farooq | B60R 21/23138 |
| 2018/0265027 A1* | 9/2018 | Nusier | B60R 21/16 |
| 2020/0017058 A1* | 1/2020 | Jaradi | B60R 21/233 |
| 2021/0394702 A1* | 12/2021 | Farooq | B60R 21/214 |
| 2022/0063546 A1 | 3/2022 | Jaradi et al. | |
| 2022/0134991 A1* | 5/2022 | Farooq | B60R 21/232 |
| | | | 280/730.1 |
| 2022/0144205 A1* | 5/2022 | Zhao | B60R 21/01512 |
| 2022/0242358 A1* | 8/2022 | Farooq | A61G 3/0808 |

FOREIGN PATENT DOCUMENTS

| | | | |
|---|---|---|---|
| CN | 116142124 A * | 5/2023 | B60R 21/01512 |
| DE | 102019114894 A1 * | 2/2020 | B60R 21/0132 |
| DE | 102020111951 A1 | 11/2021 | |
| DE | 102021115761 A1 * | 12/2021 | B60R 21/213 |
| DE | 102021118495 A1 * | 1/2023 | |
| DE | 102023112537 A1 * | 11/2023 | A61G 3/0808 |

* cited by examiner

SLIDABLE POST WITH AIRBAG FOR WHEELCHAIR OCCUPANTS

BACKGROUND

Passenger vehicles are not typically designed to accommodate wheelchairs. Therefore, accommodations for wheelchairs in vehicles are typically installed with aftermarket modifications to a production vehicle. For example, a vehicle may be modified with a lift or the like to load a wheelchair onto a vehicle. Production vehicles typically do not have the ability to accommodate the wheelchair of an occupant in a manner allowing the occupant to sit in the wheelchair in the vehicle, or if they do, significant aftermarket modification is required.

Additionally, vehicles are equipped with airbags which act as supplemental restraints for occupants during certain vehicle impacts. The airbags are located at various fixed positions in occupant compartments of vehicles. Vehicles may include airbags supported on a dash, side air curtains mounted to the roof rails, side airbags mounted to seats, etc.

DETAILED DESCRIPTION

Figure 1:
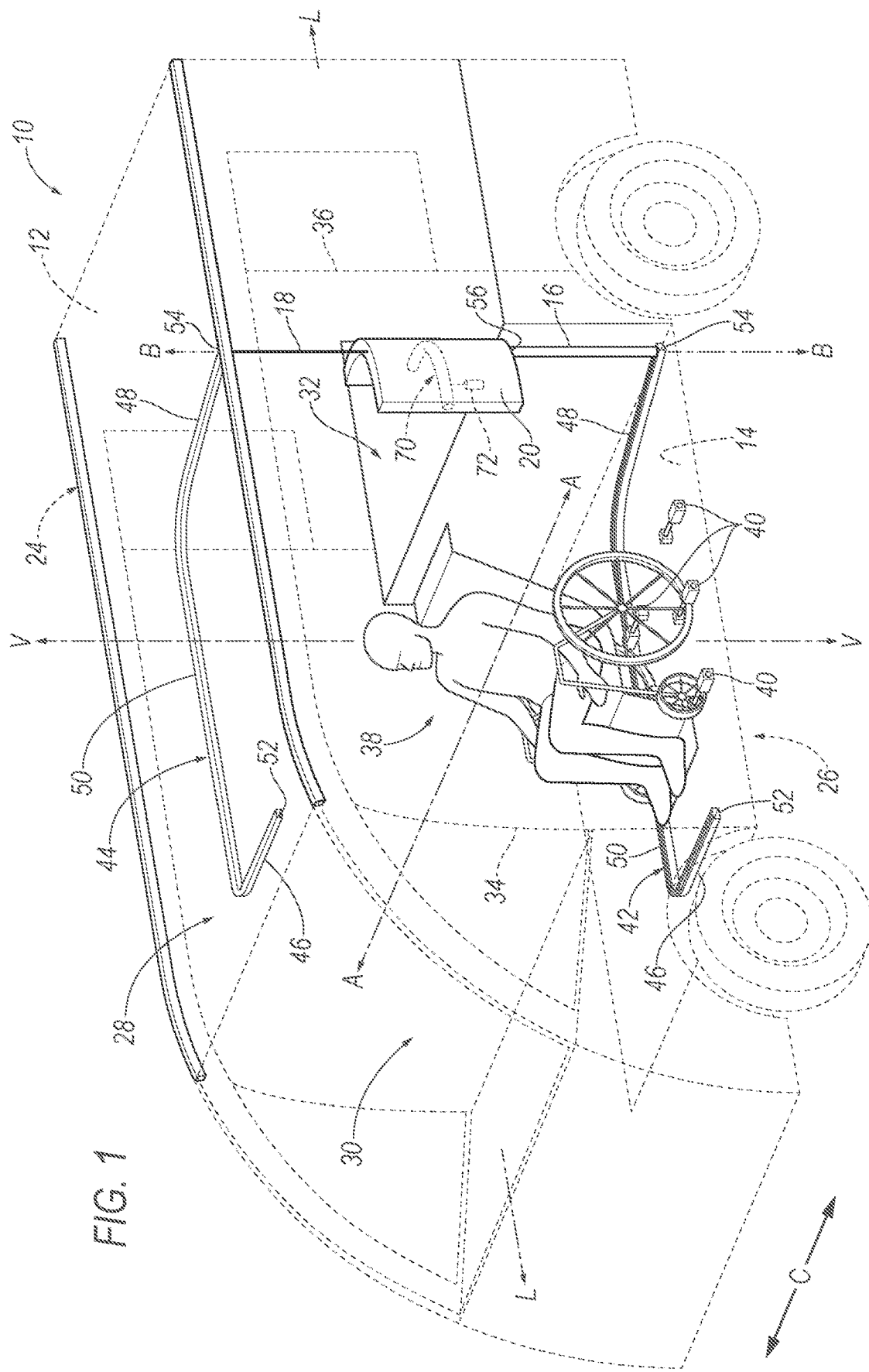
FIG. 1 is a perspective view of a vehicle having a post in a stowed position.

A vehicle includes a vehicle roof and a vehicle floor spaced downwardly from the vehicle roof. The vehicle includes a post slidably supported by one of the vehicle floor and the vehicle roof and a tether slidably engaged with the other of the vehicle floor and the vehicle roof. The tether extends from the other of the vehicle floor and the vehicle roof toward the post. The post is slidable relative to the vehicle floor and the vehicle roof from a stowed position to a deployed position. The vehicle includes a support member mounted to the post between the vehicle floor and the vehicle roof. The vehicle includes an airbag supported by the support member. The airbag is inflatable to an inflated position when the post is in the deployed position.

The vehicle may include a first track on one of the vehicle floor and the vehicle roof and a second track on the other of the vehicle floor and the vehicle roof. The post may be slidably engaged with the first track and the tether may be slidably engaged with the second track.

The first track and the second track may each include a pair of cross-vehicle portions and a vehicle-longitudinal portion extending from one cross-vehicle portion to the other cross-vehicle portion. The cross-vehicle portions may extend along a cross-vehicle axis and the vehicle-longitudinal portion may extend along a vehicle-longitudinal axis.

The vehicle may include a wheelchair seating area between the cross-vehicle portions along the vehicle-longitudinal axis.

The vehicle may include a body side extending from the vehicle floor to the vehicle roof. The wheelchair seating area may be between the vehicle-longitudinal portion and the body side along the cross-vehicle axis.

The vehicle-longitudinal portion may be spaced vehicle-inboard along the cross-vehicle axis from the body side.

The wheelchair seating area may be between the body side and at least one of the first track and the second track.

The deployed position may be positioned along one of the cross-vehicle portions of the first track and the second track.

The vehicle may include a wheelchair seating area. At least one of the first track and the second track may extend around the wheelchair seating area on at least three sides of the wheelchair seating area.

The airbag may be between the support member and the wheelchair seating area in the inflated position.

The airbag may inflate away from the support member and toward the wheelchair seating area to the inflated position.

The tether may be slidable along one of the first track and the second track as the post slides along the other of the first track and the second track.

The tether and the post may be elongated along an axis from the vehicle roof to the vehicle floor. The support member may be between the tether and the post along the axis.

The tether may be slidable along one of the vehicle floor and the vehicle roof as the post slides along the other of the vehicle floor and the vehicle roof.

The post may be slidable along a cross-vehicle axis and along a vehicle-longitudinal axis from the stowed position to the deployed position.

The deployed position may be spaced from the stowed position along a vehicle-longitudinal axis.

The deployed position may be spaced vehicle-inboard from the stowed position along a cross-vehicle axis.

The post may be slidable from the deployed position to a second deployed position spaced from the deployed position along the vehicle floor.

The vehicle may include a computer including a processor and a memory storing instructions executable by the processor to identify the presence of a wheelchair, identify whether the wheelchair is forward-facing, and, based on identification of the wheelchair being forward-facing, move the post to the deployed position.

The processor may store instructions executable by the processor to identify whether the wheelchair is rearward-facing and, based on identification of the wheelchair being rearward-facing, move the post to the second deployed position.

With reference to the Figures, wherein like numerals indicate like parts throughout the several views, a vehicle 10 includes a vehicle roof 12 and a vehicle floor 14 spaced downwardly from the vehicle roof 12. The vehicle 10 includes a post 16 slidably supported by one of the vehicle floor 14 and the vehicle roof 12 and a tether 18 slidably engaged with the other of the vehicle floor 14 and the vehicle roof 12. The tether 18 extends from the other of the vehicle floor 14 and the vehicle roof 12 toward the post 16. The post 16 is slidable relative to the vehicle floor 14 and the vehicle roof 12 from a stowed position to a deployed position (hereinafter referred to as the "first deployed position"). The vehicle 10 includes a support member 20 mounted to the post 16 between the vehicle floor 14 and the vehicle roof 12. The vehicle 10 includes an airbag 22 supported by the support member 20. The airbag 22 is inflatable to an inflated position when the post 16 is in the deployed position.

The vehicle 10 may accommodate wheelchairs and wheelchair occupants. The post 16 moves from the stowed position to the first deployed position to be forward of a wheelchair occupant. The post 16 moves along one of the vehicle floor 14 and the vehicle roof 12 and the tether 18 moves along the other of the vehicle floor 14 and the vehicle roof 12. In the event of certain vehicle impacts, the airbag 22 may move to the inflated position. The support member 20 and the tether 18 act a reaction surface for the airbag 22 and allow the airbag 22 to control the kinematics of the occupant of the wheelchair.

Figure 2:
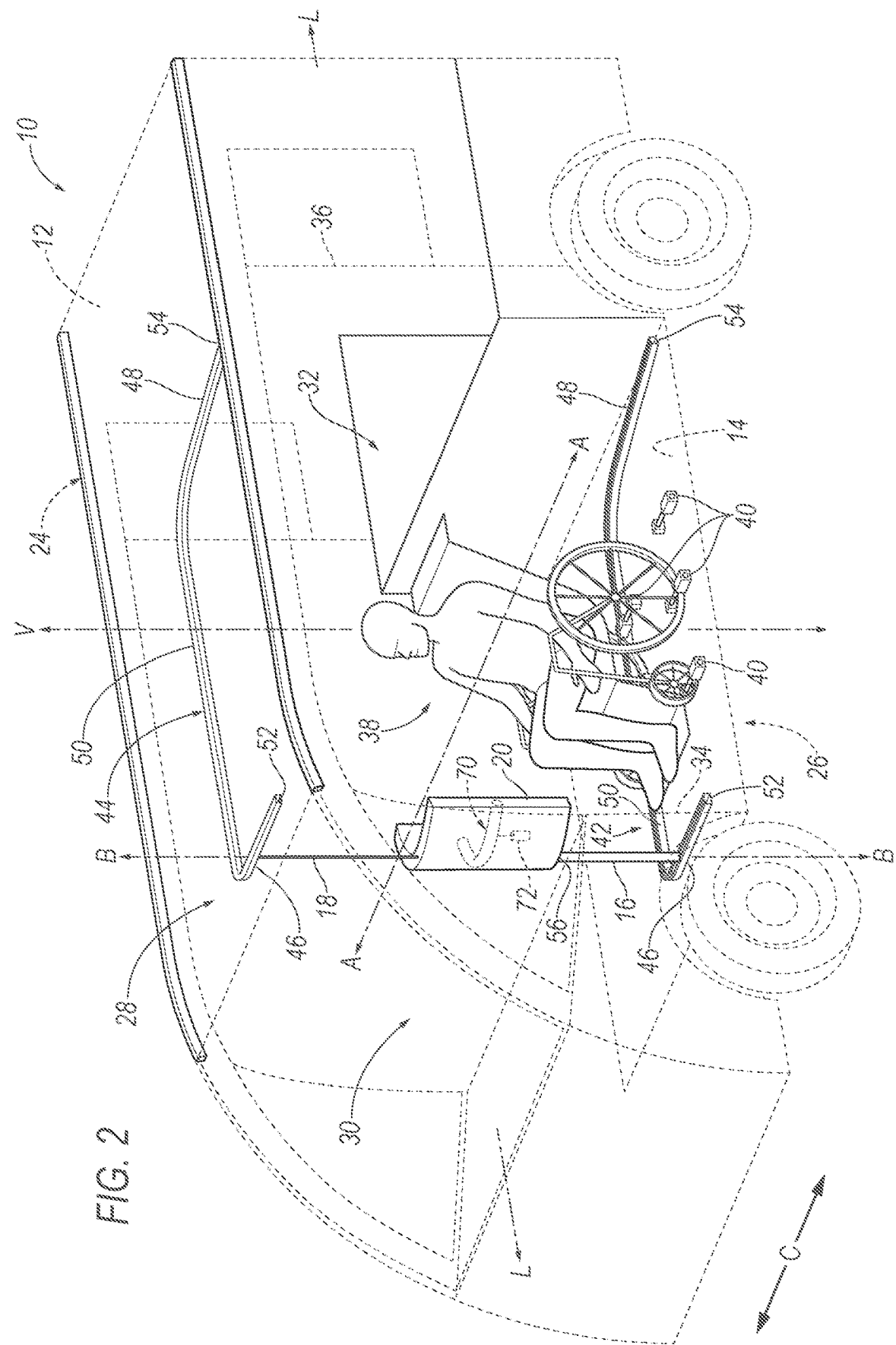
FIG. 2 is a perspective view of the vehicle having the post in a first deployed position.
Figure 4:
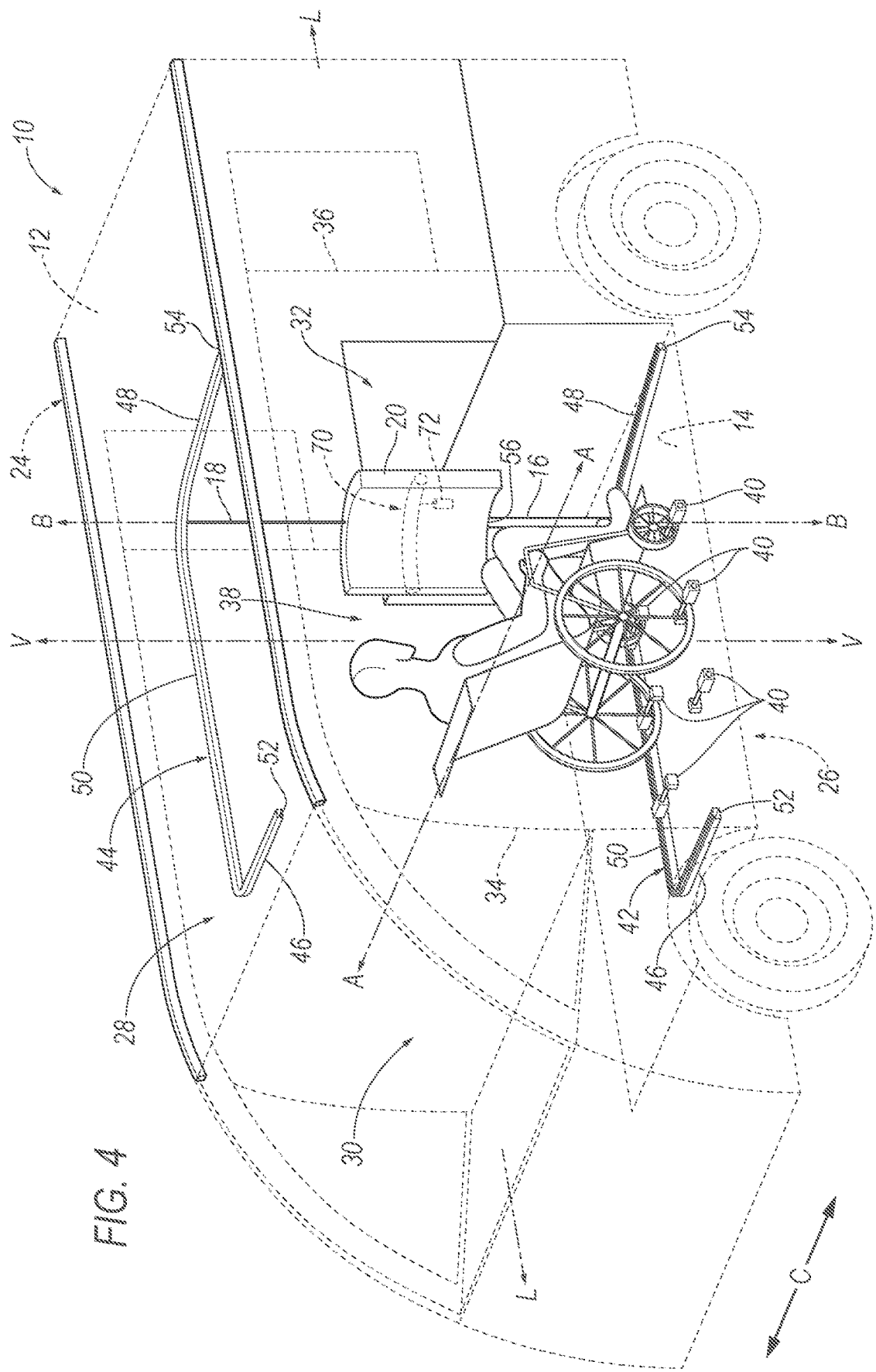
FIG. 4 is a perspective view of the vehicle having the post in a second deployed position.

With reference to FIGS. 1, 2, and 4, the vehicle 10 may be any suitable type of ground vehicle, e.g., a passenger or commercial automobile such as a sedan, a coupe, a truck, a sport utility, a crossover, a van, a minivan, a taxi, a bus, etc.

The vehicle 10 defines a vehicle-longitudinal axis L extending between a front vehicle end (not numbered) and a rear vehicle end (not numbered) of the vehicle 10. The vehicle 10 defines a cross-vehicle axis A extending cross-vehicle from one side to the other side of the vehicle 10. A cross-vehicle direction C is parallel to the cross-vehicle axis A. The vehicle 10 defines a vertical axis V. The vehicle-longitudinal axis L, the cross-vehicle axis A, and the vertical axis V are perpendicular relative to each other.

The vehicle 10 may include a vehicle body 24. The vehicle body 24 includes body panels (not all numbered) partially defining an exterior of the vehicle 10. The body panels may present a class-A surface, e.g., a finished surface exposed to view by a customer and free of unaesthetic blemishes and defects. As discussed below, the vehicle body 24 includes the vehicle roof 12 and the vehicle floor 14.

The vehicle body 24 may include a body side 26 extending from the vehicle floor 14 to the vehicle roof 12. The body side 26 may be of any suitable material. The body side 26 may define openings (not shown) for vehicle doors (not shown) for ingress and egress of occupants and wheelchairs. The vehicle 10 may include a body side 26 on each side of the vehicle 10. In other words, the body sides 26 may be spaced cross-vehicle from each other. The body sides 26 may be identical on each side of the vehicle 10 or may be different on each side of the vehicle 10, depending on the type of vehicle 10.

The vehicle body 24 defines an occupant compartment 28 to house occupants, if any, of the vehicle 10. The occupant compartment 28 may extend across the vehicle 10, i.e., from one side to the other side of the vehicle 10. The occupant compartment 28 includes a front end 30 and a rear end 32 with the front end 30 being in front of the rear end 32 during forward movement of the vehicle 10.

The vehicle body 24, specifically, the vehicle roof 12, includes at least two roof rails (not numbered). The roof rails are cross-vehicle spaced from each other along the cross-vehicle axis A and are generally parallel to each other in the cross-vehicle direction C. The roof rails each extend longitudinally along the vehicle body 24, i.e., along the vehicle-longitudinal axis L of the vehicle body 24. The vehicle body 24 may include any suitable number of roof rails spaced from one another and extending longitudinally along the vehicle body 24.

The vehicle 10 includes the vehicle floor 14 that defines the lower boundary of the occupant compartment 28. The vehicle floor 14 may extend from the front end 30 of the occupant compartment 28 to the rear end 32 of the occupant compartment 28. The vehicle floor 14 may include upholstery, for example, carpet, and may have a class-A surface facing the occupant compartment 28, i.e., a surface specifically manufactured to have a high quality, finished, aesthetic appearance free of blemishes.

The vehicle roof 12 and the vehicle floor 14 are spaced from each other. Specifically, the vehicle floor 14 is spaced downwardly from the vehicle roof 12. Specifically, the vehicle floor 14 is spaced downwardly along the vertical axis V from the vehicle roof 12. The vehicle roof 12 defines the upper boundary of the occupant compartment 28 and may extend from the front end 30 of the occupant compartment 28 to the rear end 32 of the occupant compartment 28. The vehicle roof 12 may include a roof panel (not numbered) extending from one roof rail to the other roof rail. The roof panel may be irremovably fixed to the roof rails. In other words, the roof panel is secured to the roof rails in such a way that removal requires destruction such as cutting, e.g., cutting material and/or welded joints, etc. As an example, the roof panel may be attached to both roof rails, e.g., by welding, fasteners, etc.

With continued reference to FIGS. 1, 2, and 4, the vehicle body 24 may include vehicle pillars 34, 36 spaced from each along the vehicle-longitudinal axis L on both sides of the vehicle body 24. Specifically, the vehicle body 24 includes a front pillar 34 and a rear pillar 36 spaced vehicle-rearward from the front pillar 34. The vehicle 10 includes a set of vehicle pillars 34, 36 on each side of the vehicle body 24. For example, the vehicle body 24 includes a front pillar 34 and a rear pillar 36 on each side of the vehicle 10 with the vehicle pillars 34, 36 being spaced from each other along the vehicle-longitudinal axis L. In other words, the front pillar 34 may be disposed at the front end 30 of the occupant compartment 28, the rear pillar 36 may be disposed at the rear end 32 of the occupant compartment 28. The vehicle pillars 34, 36 on both sides of the vehicle 10 may extend from the vehicle roof 12 to the vehicle floor 14 to support the vehicle roof 12. The vehicle 10 may include other vehicle pillars in addition to the front pillar 34 and the rear pillar 36.

The occupant compartment 28 defines a wheelchair seating area 38. The wheelchair seating area 38 is the area occupied by a wheelchair and occupant of the wheelchair when properly seated in the vehicle 10. The wheelchair seating area 38 may face the front end 30 of the occupant compartment 28 and the wheelchair seating area 38 may face the rear end 32 of the occupant compartment 28 depending on the direction which the wheelchair faces when installed in the vehicle 10. The wheelchair seating area 38 may be adjacent at least one of the body sides 26 of the vehicle 10. Specifically, the wheelchair seating area 38 is vehicle-inboard of the body side 26. In other words, the body side 26 is vehicle-outboard of the wheelchair seating area 38.

The wheelchair may be of any suitable type that supports a seated occupant and provides mobility to the seated occupant, i.e., the wheelchair transports the seated occupant outside of the vehicle 10 and moves the seated occupant in the passenger compartment during ingress to and egress from the vehicle 10. The wheelchair supports the seated occupant in the occupant compartment 28 during operation of the vehicle 10. The wheelchair may include wheels that are latchable to the vehicle floor as described further below.

The wheelchair may be forward-facing in the vehicle 10 or may be rearward-facing in the vehicle 10. When the wheelchair is forward-facing, the occupant of the wheelchair faces the front end 30 of the occupant compartment 28. In other words, when the vehicle 10 is in forward motion along a roadway, the wheelchair faces the direction of forward motion of the vehicle 10. When the wheelchair is rearward-facing, the occupant of the wheelchair faces the rear end 32 of the occupant compartment 28. In other words, when the vehicle 10 is in forward motion along a roadway, the occupant faces the opposite direction of the forward motion of the vehicle 10.

The vehicle 10 may include a plurality of latches 40 supported by the vehicle floor 14. The latches 40 may engage wheels of the wheelchair to lock the wheels of the wheelchair relative to the vehicle floor 14, including along the vehicle-longitudinal axis L. The latches 40 may be anchored to the vehicle floor 14 and may retractably extend through the wheels of the wheelchair. The vehicle 10 may include any suitable number of latches 40 for the number of wheelchairs that may be accommodated by the vehicle 10. The latches 40 may be any suitable type of latches 40. For example, the latches 40 may be of the type that are manually operated by an occupant of the wheelchairs. In other examples, the latches 40 may be of the type that are electronically operated, e.g., solenoid, to latch the wheels of the wheelchair, e.g., through a human-machine interface such as a button, switch, touch-screen, etc. In the example in the Figures, the vehicle 10 includes six latches 40. Four latches 40 are used in either direction that the wheelchair may be facing in the vehicle 10.

The vehicle 10 includes a first track 42 and a second track 44. The first track 42 is on one of the vehicle floor 14 and the vehicle roof 12 and the second track 44 is on the other of the vehicle floor 14 and the vehicle roof 12. In other words, the first track 42 and the second track 44 are spaced from each other along the vertical axis V of the vehicle 10. Specifically, one of the tracks 42, 44 is on the vehicle floor 14 and one of the tracks 42, 44 is on the vehicle roof 12. In the example shown in the Figures, the first track 42 is on the vehicle floor 14 and the second track 44 is on the vehicle roof 12.

The first track 42 is supported on one of the vehicle floor 14 and the vehicle roof 12 and the second track 44 is supported on one of the vehicle floor 14 and the vehicle roof 12. The first track 42 and the second track 44 are each fixed relative to the vehicle floor 14 and the vehicle roof 12. In other words, the first track 42 and the second track 44 are each fixed to one of the vehicle floor 14 and the vehicle roof 12. In the example shown in the Figures, the first track 42 is fixed to the vehicle floor 14 and the second track 44 is fixed to the vehicle roof 12.

As discussed further below, the post 16 is slidably supported by one of the vehicle floor 14 and the vehicle roof 12. Specifically, the post 16 is slidably supported by one of the first track 42 and the second track 44. In other words, the post 16 is slidable along one of the first track 42 and the second track 44. In the example shown in the Figures, the post 16 is slidably supported by the first track 42. In other examples, the post 16 may be slidably supported by the second track 44, e.g., the vehicle roof 12.

At least one of the first track 42 and the second track 44 extend around the wheelchair seating area 38. Specifically, at least one of the first track 42 and the second track 44 at least partially extend around the wheelchair seating area 38. For example, as shown in FIGS. 1-6, at least one of the first track 42 and the second track 44 extend around the wheelchair seating area 38 on at least three sides of the wheelchair seating area 38. At least a portion of the first track 42 and the second track 44 may be vehicle-forward of the wheelchair seating area 38, at least a portion of the first track 42 and the second track 44 may be vehicle-rearward of the wheelchair seating area 38, and a least a portion is vehicle-inboard of the wheelchair seating area 38. Specifically, as shown in the Figures, the first track 42 extends around the wheelchair seating area 38 along the vehicle floor 14. The second track 44 extends around the wheelchair seating area 38 along the vehicle roof 12. As described further below, the first track 42 and the second track 44 extending around the wheelchair seating area 38 allows the post 16 and the support member 20 to move to one or more positions around the occupant depending on a direction the wheelchair is facing.

In the cross-vehicle direction C, the wheelchair seating area 38 is between one of the body sides 26 and at least one of the first track 42 and the second track 44. Specifically, the wheelchair seating area 38 is between the body side 26 most adjacent to the wheelchair seating area 38 and at least one of the first track 42 and the second track 44. In other words, an occupant of the vehicle 10 is seated in the wheelchair between the body side 26 and at least one of the first track 42 and the second track 44. The body side 26 is vehicle-outboard of the tracks 42, 44 and of the wheelchair seating area 38. In other words, at least a portion of the first track 42 and the second track 44 are vehicle-inboard of the wheelchair seating area 38 in the cross-vehicle direction C. As shown in the Figures, the wheelchair seating area 38 is between the first track 42 and the body side 26 along the vehicle floor 14 in the cross-vehicle direction C. The wheelchair seating area 38 is between the second track 44 and the body side 26 along the vehicle roof 12 in the cross-vehicle direction C.

The first track 42 and the second track 44 may surround the wheelchair seating area 38 on at least three sides. At least a portion of the first track 42 and the second track 44 may be vehicle-forward of the wheelchair seating area 38, at least a portion of the first track 42 and the second track 44 may be vehicle-rearward of the wheelchair seating area 38, and a least a portion is vehicle-inboard of the wheelchair seating area 38. In other words, each of the first track 42 and the second track 44 include a plurality of portions 46, 48, 50 that surround the wheelchair seating area 38. Specifically, the first track 42 and the second track 44 each include a pair of cross-vehicle portions 46, 48 and a vehicle-longitudinal portion 50. Specifically, the first track 42 and the second track 44 each include a first cross-vehicle portion 46, a second cross-vehicle portion 48, and the vehicle-longitudinal portion 50. The cross-vehicle portions 46, 48 are spaced from each other along the vehicle-longitudinal axis L. The cross-vehicle portions 46, 48 are spaced from each other by the vehicle-longitudinal portion 50. One of the cross-vehicle portions 46, 48 is vehicle-forward of the other of the cross-vehicle portions 46, 48, i.e., one of the cross-vehicle portions 46, 48 is vehicle-rearward of the other of the cross-vehicle portions 46, 48. Specifically, the first cross-vehicle portion 46 is vehicle-forward of the second cross-vehicle portion 48. Said differently, the second cross-vehicle portion 48 is vehicle-rearward of the first cross-vehicle portion 46. Specifically, one of the cross-vehicle portions 46, 48 is vehicle-forward of the wheelchair seating area 38 and the other of the cross-vehicle portions 46, 48 is vehicle-rearward of the wheelchair. The first cross-vehicle portion 46 may be vehicle-forward of the wheelchair seating area 38 and the second cross-vehicle portion 48 may be vehicle-rearward of the wheelchair seating area 38. In other words, the wheelchair seating area 38 is between the first cross-vehicle portion 46 and the second cross-vehicle portion 48. Specifically, the wheelchair seating area 38 is between the first cross-vehicle portion 46 and the second cross-vehicle portion 48 along the vehicle-longitudinal axis L.

The cross-vehicle portions 46, 48 are elongated at least partially along the cross-vehicle axis A. Specifically, the cross-vehicle portions 46, 48 extend at least partially along the cross-vehicle axis A. The cross-vehicle portions 46, 48 may extend vehicle-inboard away from the body side 26. In other words, the cross-vehicle portions 46, 48 may extend away from the body side 26 toward a center of the vehicle 10. In some examples, the cross-vehicle portions 46, 48 may extend entirely along the cross-vehicle axis A. For example, as shown in the Figures, the first cross-vehicle portion 46 is elongated away from the body side 26 along the cross-vehicle axis A. In other examples, the cross-vehicle portions 46, 48 may extend partially along the vehicle-longitudinal axis L. In other words, the cross-vehicle portion may extend along the cross-vehicle axis A and the vehicle-longitudinal axis L, e.g., in examples where the cross-vehicle portions 46, 48 are non-linear, in examples where the cross-vehicle portions 46, 48 extend diagonally in the occupant compartment 28, etc. For example, as shown in the Figures, the second cross-vehicle portion 48 is elongated diagonally away from the body side 26, i.e., the second cross-vehicle portion 48 is elongated linearly away from the body side 26. Specifically, a first component of the second cross-vehicle portion 48 is elongated along the cross-vehicle axis A and a second component of the second cross-vehicle portion 48 is elongated along the vehicle-longitudinal axis L.

The cross-vehicle portions 46, 48 each extend from a distal end 52, 54 to the vehicle-longitudinal axis L. In other words, the first cross-vehicle portion 46 extends from a first distal end 52 to the vehicle-longitudinal portion 50 and the second cross-vehicle portion 48 extends from a second distal end 54 to the vehicle-longitudinal portion 50. The distal ends 52, 54 may be between the vehicle-longitudinal portion 50 and the body side 26. In other words, the distal ends 52, 54 may be adjacent the body side 26. The distal ends 52, 54 may be spaced from the body side 26. In the example shown in the Figures, the first distal end 52 of the first cross-vehicle portion 46 is spaced farther from the body side 26 than the second distal end 54 of the second cross-vehicle portion 48.

The vehicle-longitudinal portion 50 is spaced vehicle-inboard along the cross-vehicle axis A from the body side 26. In other words, the vehicle-longitudinal portion 50 is spaced from the body side 26 toward a center of the vehicle 10. The vehicle-longitudinal portion 50 is vehicle-inboard of the wheelchair seating area 38. In other words, the wheelchair seating area 38 is between the vehicle-longitudinal portion 50 and the body side 26 along the cross-vehicle axis A. The vehicle-longitudinal portion 50 may be spaced from the body side 26 by the wheelchair seating area 38.

The vehicle-longitudinal portion 50 is elongated along the vehicle-longitudinal axis L. In other words, the vehicle-longitudinal portion 50 extends along the vehicle-longitudinal axis L. The vehicle-longitudinal portion 50 may be elongated linearly along the vehicle-longitudinal axis L. The vehicle-longitudinal portion 50 extends from one cross-vehicle portion to the other cross-vehicle portion. In other words, the vehicle-longitudinal portion 50 extends from the first cross-vehicle portion 46 to the second cross-vehicle portion 48.

The vehicle 10 includes the post 16. The post 16 may be elongated along an axis from the vehicle roof 12 to the vehicle floor 14. The axis B may be parallel with the vertical axis V of the vehicle 10. In the example shown in the Figures, the post 16 may be elongated from the vehicle floor 14 to a top end 56 spaced upwardly from the vehicle floor 14 and downwardly from the vehicle roof 12. Specifically, the post 16 may be elongated from the vehicle floor 14 to the top end 56 spaced upwardly from the vehicle floor 14 and downwardly from the vehicle roof 12 along the axis B. The post 16 may be of any suitable shape. For example, as shown in the Figures, the post 16 may be of a cylindrical shape.

The post 16 is slidable relative to the vehicle floor 14 and the vehicle roof 12. In other words, the post 16 is slidably supported by one of the vehicle roof 12 and the vehicle floor 14. The post 16 may slide along the vehicle floor 14 and the vehicle roof 12. Specifically, the post 16 is slidably supported by one of the first track 42 and the second track 44. The post 16 is slidably engaged with one of the tracks 42, 44. In other words, the post 16 may be coupled to the tracks 42, 44 in any suitable way such that the post 16 may slide along the track. In the example shown in the Figures, the post 16 is slidably supported by the vehicle floor 14. In such an example, the post 16 is slidably supported by the first track 42, i.e., slidably engaged with the first track 42. In other examples, not shown in the Figures, the post 16 may be slidably supported by the vehicle roof 12. In such an example, the post 16 may be slidably supported by the second track 44, i.e., slidably engaged with the second track 44.

The post 16 is slidable relative to the vehicle floor 14 and the vehicle roof 12 from the stowed position to the first deployed position and from the stowed position to a second deployed position. The deployed positions may be positioned along one or more of the cross-vehicle portions 46, 48 of the first track 42 and the second track 44. The post 16 may be slidable to any suitable number of deployed positions along the tracks 42, 44. As shown in FIG. 1, the stowed position is at least adjacent the second distal end 54 of the second cross-vehicle portion 48. The stowed position may be at the second distal end 54.

Figure 3:
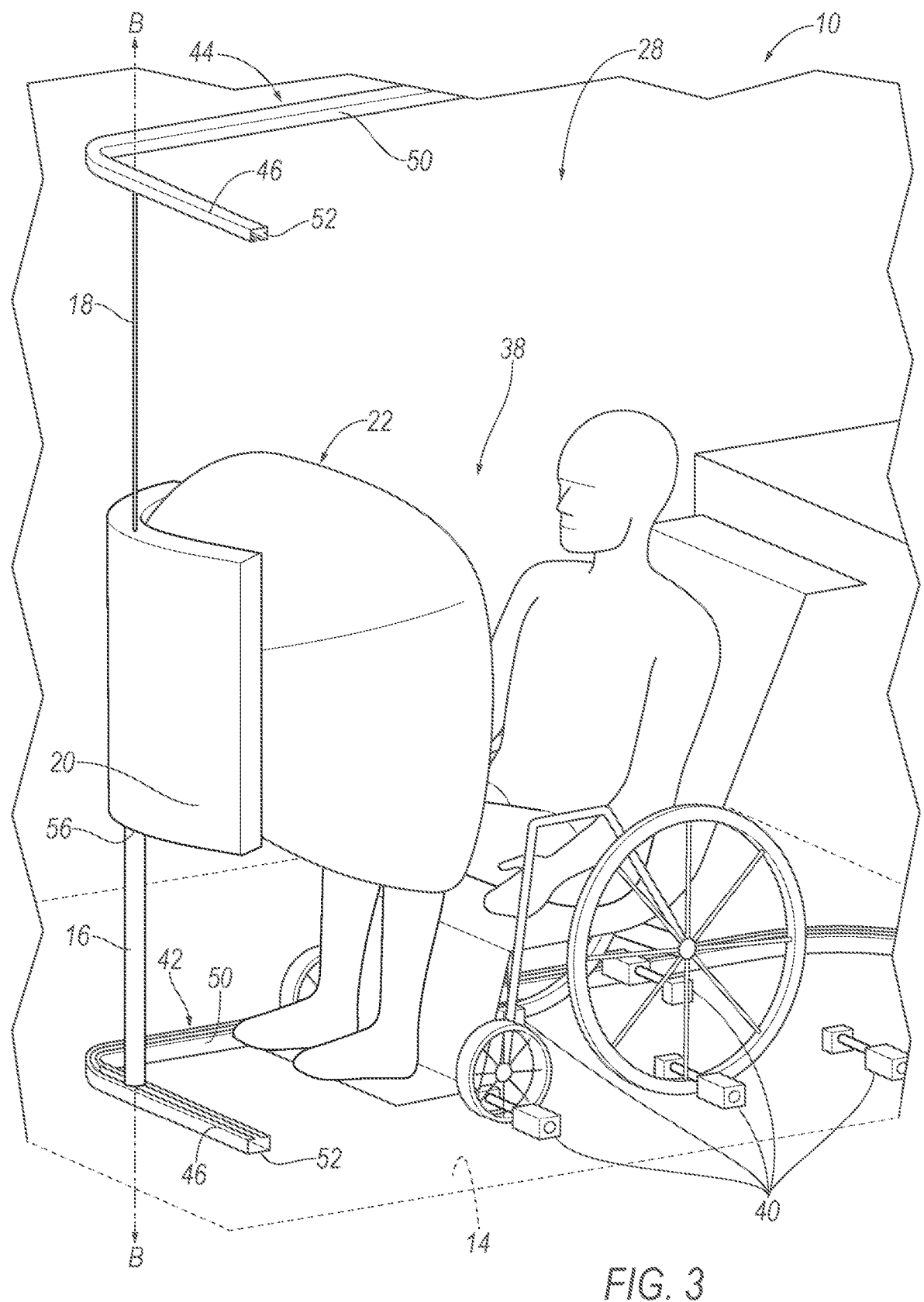
FIG. 3 is a perspective view of the vehicle having the post in the first deployed position and an airbag in an inflated position.
Figure 5:
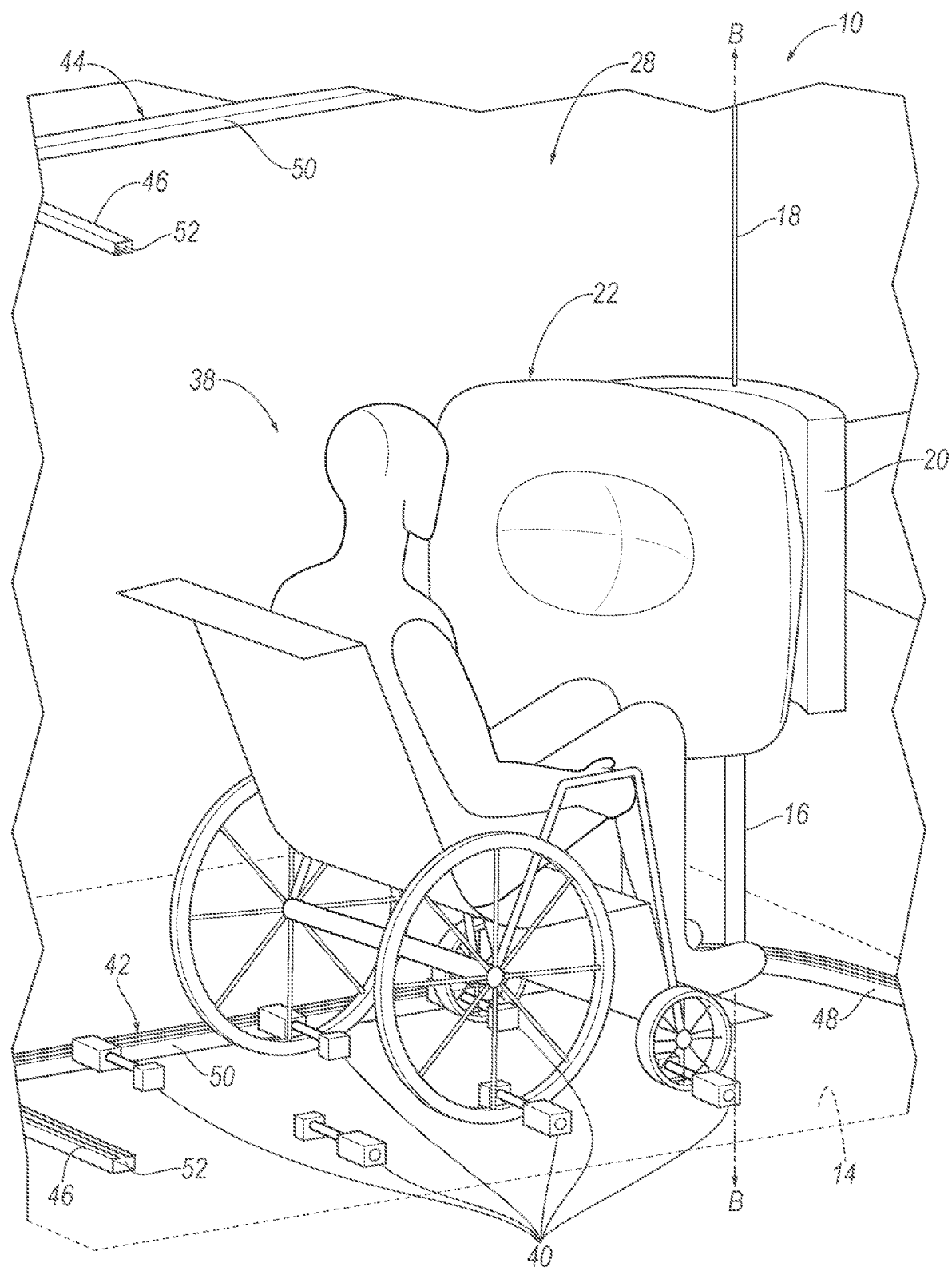
FIG. 5 is a perspective view of the vehicle having the post in the second deployed position and the airbag in the inflated position.
Figure 6:
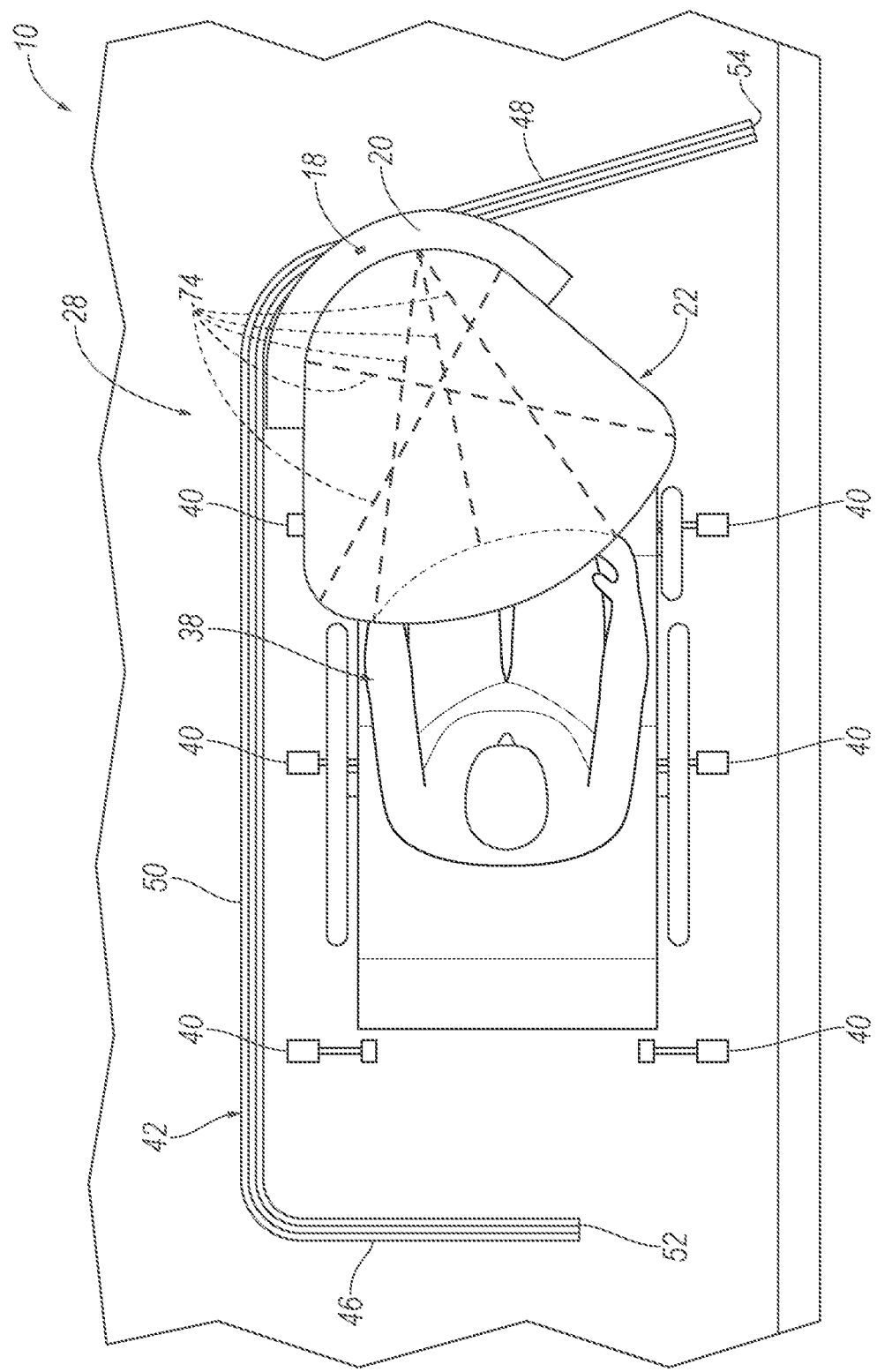
FIG. 6 is a plan view of the vehicle shown in FIG. 5.

In the example shown in FIGS. 2-6, the post 16 is slidable along the first cross-vehicle portion 46, the second cross-vehicle portion 48, and the vehicle-longitudinal portion 50 of the first track 42. In other words, the post 16 is slidable along the first track 42 between the first distal end 52 to the second distal end 54 along the first cross-vehicle portion 46, the second cross-vehicle portion 48, and the vehicle-longitudinal portion 50. Because the first track 42 is continuous from the v to the second distal end 54, the post 16 seamlessly slides from the stowed position or one of the deployed positions. A vehicle computer 58 may determine the direction along which the wheelchair is facing to determine to which of the deployed positions the post 16 moves. For example, as shown in FIGS. 2 and 3, when the wheelchair is forward-facing, the post 16 moves to the first deployed position. In other words, the post 16 moves to a position along the first track 42 that is vehicle-forward of the wheelchair that is facing vehicle-forward. As another example, as shown in FIGS. 4-6, when the wheelchair is rearward-facing, the post 16 moves to the second deployed position. In other words, the post 16 moves to a position along the first track 42 that is vehicle-rearward of the wheelchair that is facing vehicle-rearward. When the wheelchair is going to be exiting the vehicle 10, as shown in FIG. 1, the post 16 returns from the deployed positions to the stowed position.

In the example shown in FIGS. 2 and 3, as discussed above, the post 16 moves to the first deployed position when the wheelchair is forward facing. The first deployed position is spaced from the stowed position along the vehicle floor 14. Specifically, the first deployed position is spaced from the stowed position along the first track 42. The first deployed position is spaced from the stowed position along the vehicle-longitudinal axis L. The first deployed position is spaced vehicle-forward of the stowed position along the vehicle-longitudinal axis L. The first deployed position is spaced vehicle-inboard from the stowed position. In other words, the first deployed position is nearer the center of the vehicle 10 than the stowed position. The first deployed position is positioned along the first cross-vehicle portion 46. The first deployed position is spaced along the first cross-vehicle portion 46 from the first distal end 52 of the first cross-vehicle portion 46. The first deployed position may be at any suitable position along the first cross-vehicle portion 46. To reach the first deployed position, the post 16 slides from the stowed position, along the second cross-vehicle portion 48 to the vehicle-longitudinal portion 50, along the vehicle-longitudinal portion 50 to the first cross-vehicle portion 46, and along the cross-vehicle portion to the first deployed position. In other words, the post 16 is slidable along the cross-vehicle axis A and along the vehicle-longitudinal axis L from the stowed position to the first deployed position.

In the example shown in FIGS. 4-6, as discussed above, when the wheelchair is rearward facing, the post 16 moves to the second deployed position. The second deployed position is spaced from the stowed position along the vehicle floor 14. Specifically, the second deployed position is spaced from the stowed position along the first track 42. The second deployed position is spaced from the stowed position along the vehicle-longitudinal axis L. The second deployed position is spaced vehicle-forward from the stowed position along the vehicle-longitudinal axis L. The second deployed position is spaced vehicle-inboard from the stowed position. In other words, the second deployed position is nearer the center of the vehicle 10 than the stowed position. The second deployed position is positioned along the second cross-vehicle portion 48. The second deployed position is spaced along the second cross-vehicle portion 48 from the second distal end 54 of the second cross-vehicle portion 48. The second deployed position may be at any suitable position along the second cross-vehicle portion 48. To reach the second deployed position, the post 16 slides from the stowed position and along the second cross-vehicle portion 48 to the second deployed position.

In the example shown in the Figures, the second deployed position is spaced from the first deployed position along the vehicle floor 14. Specifically, the second deployed position is spaced from the first deployed position along the first track 42. The second deployed position is spaced along the vehicle-longitudinal axis L from the first deployed position.

The post 16 may move from the deployed positions back to the stowed position when the wheelchair is going to be exiting the vehicle 10. As the post 16 moves from the first deployed position, the post 16 moves along the first cross-vehicle portion 46 away from the first distal end 52 to the vehicle-longitudinal portion 50, along the vehicle-longitudinal portion 50 to the second cross-vehicle portion 48, and along the second cross-vehicle portion 48 to the stowed position. As the post 16 moves from the second deployed position, the post 16 moves along the second cross-vehicle portion 48 toward the second distal end 54 and to the stowed position. The post 16 may move from the first deployed position to the second deployed position or from the second deployed position. The post 16 may move past the second deployed position as the post 16 moves from the first deployed position to the stowed position.

The first track 42 and the second track 44 are continuous from the first distal end 52 of the first cross-vehicle portion 46 to the second distal end 54 of the second cross-vehicle portion 48. In other words, the first track 42 and the second track 44 are endless from the first distal end 52 of the first cross-vehicle portion 46 to the second distal end 54 of the second cross-vehicle portion 48. The post 16 and the tether 18 each may slide along the first track 42 and the second track 44 from the first distal end 52 of the first cross-vehicle portion 46 to the second distal end 54 of the second cross-vehicle portion 48. The post 16 and the tether 18 may slide continuously from the stowed position to the deployed positions and to any other positions suitable along the tracks 42, 44.

With reference to FIGS. 1-6, the vehicle 10 includes the support member 20 connected to the post 16. Specifically, the support member 20 is mounted to the post 16. In other words, the support member 20 is fixed to the post 16. The support member 20 is fixed to the post 16 between the vehicle floor 14 and the vehicle roof 12. Specifically, the support member 20 is spaced upwardly from the vehicle floor 14 and downwardly from the vehicle roof 12. In the example shown in the Figures, the support member 20 is mounted to the top end 56 of the post 16 between the vehicle floor 14 and the vehicle roof 12. Specifically, the support member 20 is spaced from the vehicle roof 12 and the vehicle floor 14 along the axis B.

The vehicle 10 includes the tether 18. The tether 18 is elongated along the axis B of post 16 on an opposite side of the support member 20. Specifically, the tether 18 may be elongated along the axis B from the support member 20 on the opposite side of the support member 20 from the post 16. In other words, the support member 20 is between the post 16 and the tether 18 along the axis B. The post 16 extends from one of the vehicle floor 14 and the vehicle roof 12 and the tether 18 extends from the other of the vehicle floor 14 and the vehicle roof 12. In examples such as shown in the Figures, the post 16 is elongated from the vehicle floor 14 to the support member 20 and the tether 18 is elongated from the support member 20 upwardly from the support member 20 to the vehicle roof 12. In such an example, the tether 18 is above the support member 20 along the vertical axis V of the vehicle 10 and the post 16 is below the support member 20 along the vertical axis V of the vehicle 10. In other examples, such as where the post 16 is elongated from the vehicle roof 12 to the support member 20, the tether 18 is elongated from the vehicle floor 14 to the support member 20. In such an example, the tether 18 may be below the support member 20 along the vertical axis V of the vehicle 10 and the post 16 may be above the support member 20 along the vertical axis V of the vehicle 10.

The tether 18 is slidable relative to the vehicle floor 14 and the vehicle roof 12. In other words, the tether 18 is slidable along one of the vehicle floor 14 and the vehicle roof 12. As the post 16 slides along one of the vehicle floor 14 and the vehicle roof 12, the tether 18 slides relative to the vehicle roof 12 and the vehicle floor 14. Specifically, as the post 16 slides along one of the vehicle floor 14 and the vehicle roof 12, the tether 18 is slidable along the other of the vehicle floor 14 and the vehicle roof 12. In the example shown in the Figures, the post 16 is slidable along the vehicle floor 14 and the tether 18 is slidable along the vehicle roof 12. In other examples, the tether 18 may be slidable along the vehicle floor 14 and the post 16 may be slidable along the vehicle roof 12.

The tether 18 is slidably engaged with one of the vehicle floor 14 and the vehicle roof 12. Specifically, the tether 18 is slidably engaged with one of the tracks 42, 44. In other words, the tether 18 may be coupled to the tracks 42, 44 in any suitable way such that the tether 18 may slide along the tracks 42, 44. In the example shown in the Figures, the tether 18 is slidably engaged with the vehicle roof 12 and the post 16 is slidably engaged with the vehicle floor 14. In such an example, the tether 18 is slidably engaged with the second track 44. In other examples, the tether 18 may be slidably engaged with the vehicle floor 14 and the post 16 may be slidably engaged with the vehicle roof 12. In such an example, the tether 18 may be slidable engaged with the first track 42.

The tether 18 is fixed to the support member 20 such that, as the post 16 moves between the stowed position and the deployed positions, the tether 18 moves relative to the vehicle floor 14 and the vehicle roof 12. For example, as shown in the Figures, as the post 16 moves from the stowed position along the first track 42, the tether 18 is pulled along the second track 44 by the post 16 and the support member 20. In other examples, such as when the post 16 moves along the second track 44, the tether 18 is pulled along the first track 42 by the post 16 and the support member 20.

The tether 18 may be of any suitable material. For example, the tether 18 may be of a fabric material or may be metal, such a metal chain.

Both the tether 18 and the post 16 may be connected to a carriage 62 that is movable along the tracks 42, 44. The post 16 and the tether 18 may be lockable relative to the vehicle floor 14 and the vehicle roof 12 in the event of certain vehicle impacts. The carriages 62 and tracks 42, 44 may include features, e.g., pegs and holes (not shown), that lock the carriages 62 relative to the tracks 42, 44. The locks may limit the movement of the tether 18 and post 16 along the v in the event of certain vehicle impacts.

Figure 7:
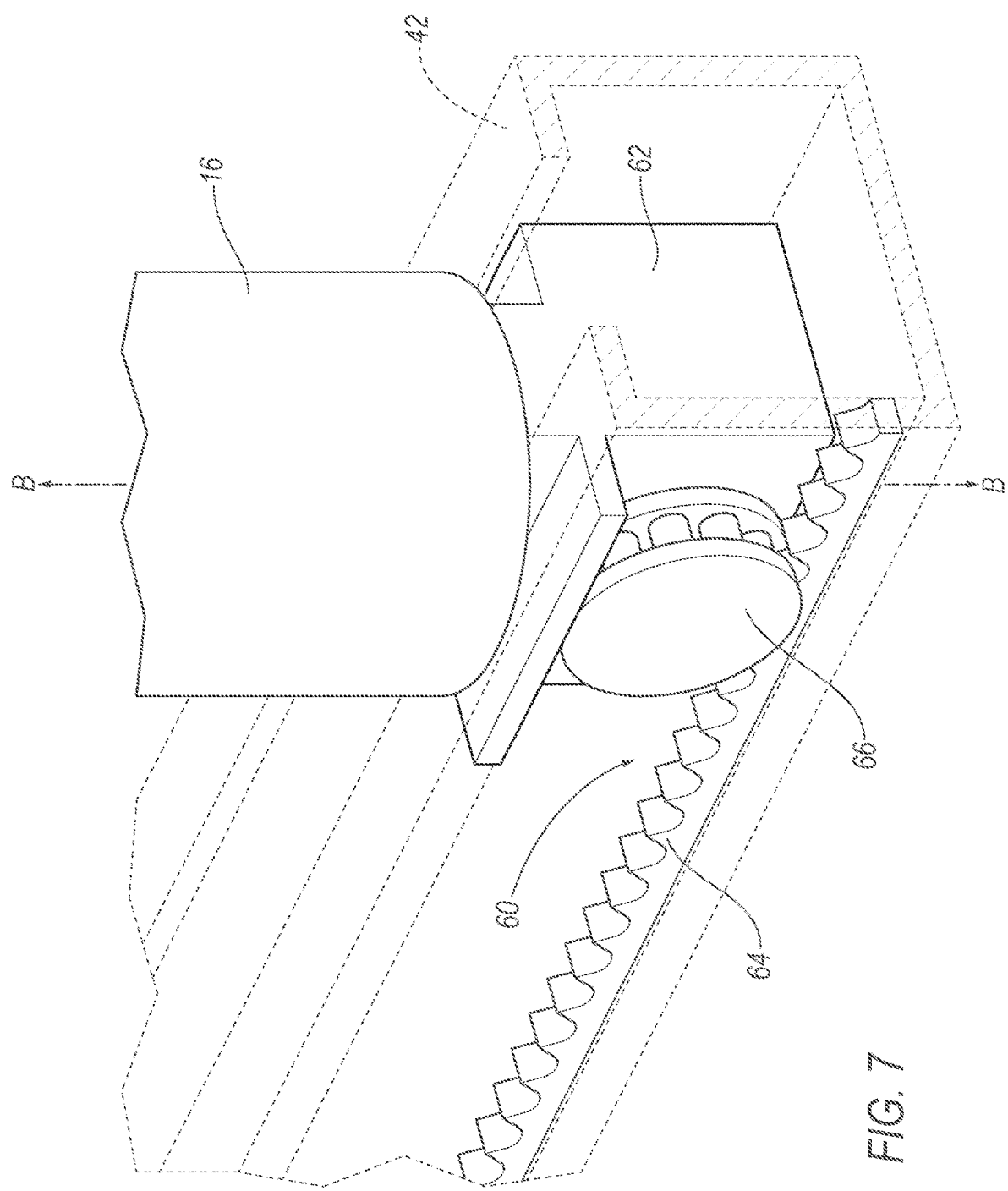
FIG. 7 is a view of a track and linear actuator that moves the post from the stowed position to the deployed positions.

With reference to FIG. 7, the vehicle 10 may include one or more linear actuators 60 fixed to one of the tracks 42, 44 and drivably coupled to the post 16 to slide the post 16 along the track. The linear actuator 60 couples to the carriage 62 of the post 16 in the first track 42 to slide the post 16 along the first track 42. The linear actuator 60 may include a rack 64 and pinion 66 to move the post 16 along the first track 42. The linear actuator 60 may include a motor 68 that rotates the pinion 66 to move along the rack 64, and in turn, moving the post 16 along the first track 42.

Again, with reference to FIGS. 1-6, the vehicle 10 includes an airbag assembly 70.

The airbag assembly 70 includes the airbag 22, an inflator 72, and may include a housing (not shown). The airbag assembly 70, i.e., the airbag 22, is supported by the support member 20. Specifically, the airbag assembly 70 is fixed to the support member 20.

The inflator 72 is fluidly connected to the airbag 22. The inflator 72 expands the airbag 22 with inflation medium, such as a gas, to move the airbag 22 from an uninflated position to the inflated position. The inflator 72 may be, for example, a pyrotechnic inflator that ignites a chemical reaction to generate the inflation medium, a stored gas inflator that releases (e.g., by a pyrotechnic valve) stored gas as the inflation medium, or a hybrid.

The airbag 22 is inflatable from the uninflated position to the inflated position. FIGS. 3, 5, and 6 show the airbag 22 in the inflated position. Specifically, the airbag 22 may inflate to the inflated position when the post 16 is in the deployed position in the event of certain vehicle impacts. FIG. 3 shows the airbag 22 in the inflated position when the post 16 is in the first deployed position. FIGS. 5 and 6 show the airbag 22 in the inflated position when the post is in the second deployed position. During such an event, the airbag 22 may inflate away from the support member 20 and toward the wheelchair seating area 38. In other words, the airbag 22 is between the support member 20 and the wheelchair seating area 38 when the airbag 22 is in the inflated position. The airbag 22 may control the kinematics of an occupant of the wheelchair in the event of certain vehicle impacts.

The support member 20 may include a covering (not numbered) to conceal the airbag assembly 70 during normal operation of the vehicle 10. In the event of certain vehicle impacts where the airbag 22 moves to the inflated position, a releasable seam (not shown) in the covering, e.g., a tear seam, may release to allow the airbag 22 to move to the inflated position.

When the airbag 22 inflates, the support member 20 acts as a reaction surface for controlling the kinematics of the occupant of the wheelchair. A tension force may be applied to the tether 18 allows the tether 18 to provide a reaction surface in addition to the support member 20.

The vehicle 10 may include any suitable number of tracks 42, 44, posts 16, support members 20, tethers 18, and/or airbags 22. For example, a second pair of tracks 42, 44 with a post 16 and tether 18 slidable along the second pair of tracks 42, 44 may be present on an opposite side of the vehicle 10, for example, for another wheelchair occupant. As another example, more than one post 16 may be slidable by the tracks 42, 44 at one time.

As shown in FIG. 6, the airbag 22 may include a plurality of internal tethers 74 that maintain the position and shape of the airbag 22. The internal tethers 74 are internal to the airbag 22. The internal tethers 74 may extend from different portion of the airbag 22 to other portions of the airbag 22 or the internal tethers 74 may extend from the support member 20 to portions of the airbag 22.

The airbag 22 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 8:
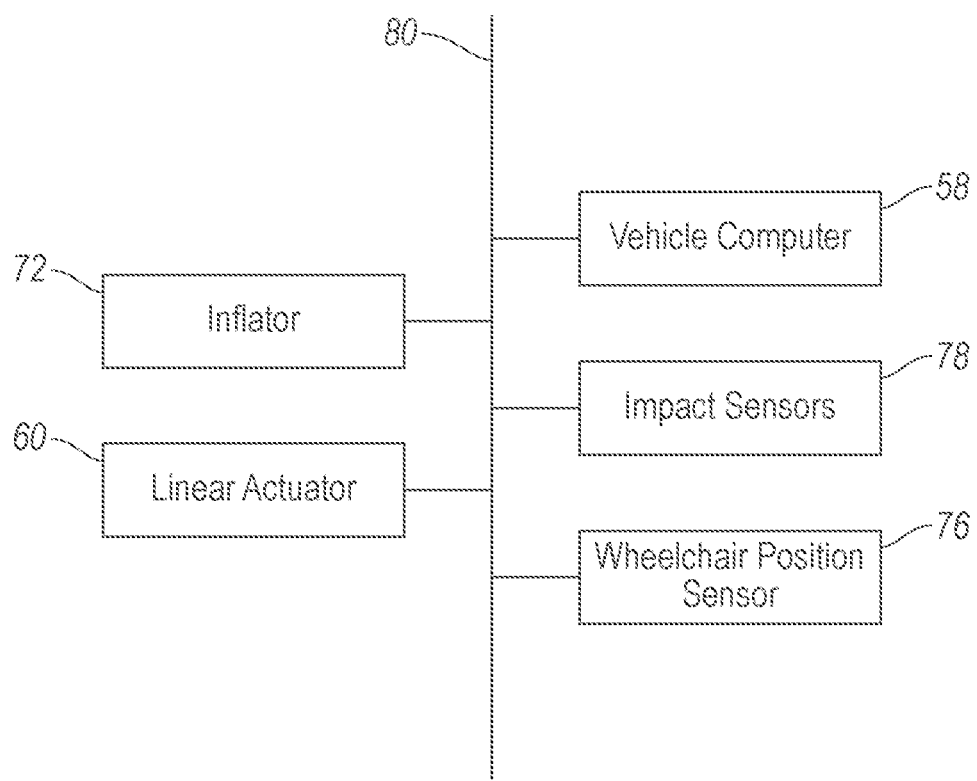
FIG. 8 is a block diagram of a vehicle communication network of the vehicle.

With reference to FIG. 8, the vehicle 10 may include wheelchair position sensors 76 to identify the presence and a position of a wheelchair in the vehicle 10. The wheelchair position sensors 76 may be in communication with the vehicle computer 58 of the vehicle 10. The wheelchair position sensors 76 may send a signal to the vehicle computer 58 to indicate that a wheelchair is present in the vehicle 10 and the position of the wheelchair. For example, the wheelchair position sensors 76 may indicate to the vehicle computer 58 whether the wheelchair is forward-facing or rearward-facing. The wheelchair position sensors 76 may be any suitable type of sensors, e.g., weight sensors, cameras, etc.

The vehicle 10 may include at least one impact sensor 78 for sensing certain vehicle impacts, and the vehicle computer 58 in communication with the impact sensor 78 and the inflator 72. The vehicle computer 58 may activate the inflator 72, e.g., provide an impulse to a pyrotechnic charge of the inflators 72 when the impact sensor 78 senses certain vehicle impacts. Alternatively or additionally to sensing certain vehicle impacts, the impact sensor 78 may be configured to sense certain vehicle impacts prior to impact, i.e., pre-impact sensing. The impact sensor 78 may be in communication with the vehicle computer 58. The impact sensor 78 is configured to detect certain vehicle impacts. The impact sensor 78 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 78 may be located at numerous points in or on the vehicle 10.

With continued reference to FIG. 8, the vehicle computer 58 includes a processor and a memory storing instructions executable by the processor. The memory includes one or more forms of computer readable media, and stores instructions executable by the vehicle computer 58 for performing various operations, including as disclosed herein. The vehicle computer 58 may be a restraints control module. The vehicle computer 58 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 58 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 58.

The vehicle computer 58 is generally arranged for communications on a vehicle communication network 80 that can include a bus in the vehicle 10 such as a controller area network CAN or the like, and/or other wired and/or wireless mechanisms. Alternatively or additionally, in cases where the vehicle computer 58 actually comprises a plurality of devices, the vehicle communication network 80 may be used for communications between devices represented as the vehicle computer 58 in this disclosure. Further, as mentioned below, various controllers and/or sensors may provide data to the vehicle computer 58 via the vehicle communication network 80.

Figure 9:
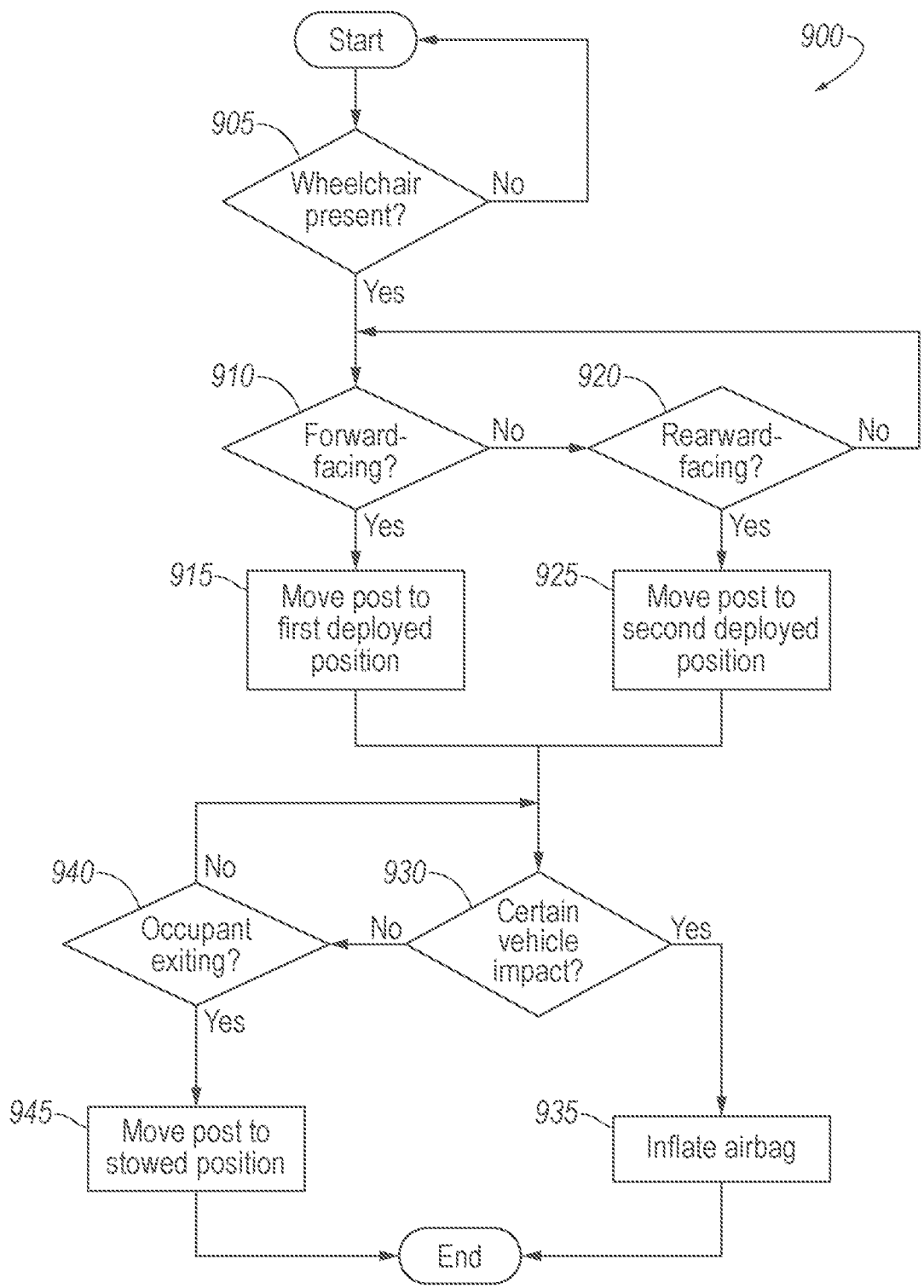
FIG. 9 is a flowchart of a method executable by a vehicle computer of the vehicle.

With reference to FIG. 9, the vehicle computer 58 stores instructions to control components of the vehicle 10 according to the method 900. Specifically, the method 900 includes moving the post 16 to one of the first deployed position or the second deployed position depending on the direction to which the wheelchair is facing. Any use of "based on" herein, including with reference to method 900, indicates a causal relationship, not merely a temporal relationship.

With reference to decision block 905, the method 900 includes identifying the presence of a wheelchair. The wheelchair position sensors 76 or other sensors of the vehicle 10 may send a signal to the vehicle computer 58 to identify that a wheelchair has been installed in the vehicle 10. If a wheelchair is present, the method 900 moves to decision block 910. If no wheelchair is present, the method 900 returns to its start.

With reference to decision block 910, the method 900 includes identifying whether the wheelchair is forward-facing. The wheelchair position sensors 76 may send a signal to the vehicle computer 58 that the wheelchair is facing the front end 30 of the occupant compartment 28. If the wheelchair is forward-facing, the method 900 continues to block 915. If the wheelchair is not forward-facing, the method 900 moves to decision block 920.

With reference to block 915, based on the identification that the wheelchair is forward-facing, the method 900 includes moving the post 16 to the first deployed position. The vehicle computer 58 may send a signal to the motor 68 of the post 16 to move the post 16 from the stowed position to the first deployed position. As the post 16 moves along the first track 42, as shown in the example of the Figures, the tether 18 moves along the second track 44 to the first deployed position.

With reference to decision block 920, based on identification that the wheelchair is not forward-facing, the method 900 includes identifying whether the wheelchair is rearward-facing. The wheelchair position sensors 76 may send a signal to the vehicle computer 58 that the wheelchair is rear-ward facing. If the wheelchair is rearward-facing, the method 900 continues to block 925. If the wheelchair is not rearward-facing, the method 900 returns to decision block 910.

With reference to block 925, based on identification of the wheelchair being rearward-facing, the method 900 includes moving the post 16 to the second deployed position. The vehicle computer 58 may send a signal to the motor 68 of the post 16 to move the post 16 to the second deployed position. As the post 16 moves along the first track 42, as shown in the example of the Figures, the tether 18 moves along the second track 44 to the first deployed position.

With reference to decision block 930, the method 900 includes identifying certain vehicle impacts. If certain vehicle impacts are identified, the impact sensors 78 may send a signal to the vehicle computer 58 indicating certain vehicle impacts. If certain vehicle impacts are identified, the method 900 moves to block 935. If certain vehicle impacts are not identified, the method 900 moves to block 940.

With reference to block 935, based on identification of certain vehicle impacts, the method 900 includes inflating the airbag 22 to the inflated position. The vehicle computer 58 may send a signal to the inflator 72 to inflate the airbag 22 from the uninflated position to the inflated position. After the airbag 22 is in the inflated position, the method 900 ends.

With reference to decision block 940, if certain vehicle impacts are not identified, the method 900 includes identifying whether an occupant is preparing to exit the vehicle 10. The determination of whether an occupant is preparing to the exit the vehicle 10 may be based on the occupant indicating to the vehicle computer 58, e.g., by pressing a button in the vehicle 10, that the occupant with be exiting the vehicle 10. If the vehicle 10 is determined to be in continued use, e.g., in Drive, the method 900 returns to block 930 to detect certain vehicle impacts. Decision block 940 may include identifying whether the vehicle 10 has been moved to Park and whether the occupant will be exiting the vehicle 10. If an occupant is determined to be leaving the vehicle 10, the method 900 moves to block 945.

With reference to block 945, based on identification that the occupant will be exiting the vehicle 10, the post 16 may slide back to the stowed position to allow the occupant to exit the vehicle 10. The motor 68 may rotate the pinion 66 to move the carriage 62 along the rack 64. The post 16 sliding to the stowed position allows for space adjacent the doors and in the door opening to allow the occupant to exit the vehicle 10 and allows the wheelchair to be removed from the vehicle 10. After the post 16 moves back to the stowed position, the method 900 ends.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. A vehicle comprising:
   a vehicle roof;
   a vehicle floor spaced downwardly from the vehicle roof;
   a post slidably supported by one of the vehicle floor and the vehicle roof and a tether slidably engaged with the other of the vehicle floor and the vehicle roof, the tether extending from the other of the vehicle floor and the vehicle roof toward the post;
   the post being slidable relative to the vehicle floor and the vehicle roof from a stowed position to a deployed position;
   a support member mounted to the post between the vehicle floor and the vehicle roof; and
   an airbag supported by the support member, the airbag being inflatable to an inflated position when the post is in the deployed position.

2. The vehicle of claim 1, further comprising a first track on one of the vehicle floor and the vehicle roof and a second track on the other of the vehicle floor and the vehicle roof, the post being slidably engaged with the first track and the tether being slidably engaged with the second track.

3. The vehicle of claim 2, wherein the first track and the second track each include a pair of cross-vehicle portions and a vehicle-longitudinal portion extending from one cross-vehicle portion to the other cross-vehicle portion, the cross-vehicle portions extending along a cross-vehicle axis and the vehicle-longitudinal portion extending along a vehicle-longitudinal axis.

4. The vehicle of claim 3, further comprising a wheelchair seating area between the cross-vehicle portions along the vehicle-longitudinal axis.

5. The vehicle of claim 4, further comprising a body side extending from the vehicle floor to the vehicle roof, the wheelchair seating area being between the vehicle-longitudinal portion and the body side along the cross-vehicle axis.

6. The vehicle of claim 5, wherein the vehicle-longitudinal portion is spaced vehicle-inboard along the cross-vehicle axis from the body side.

7. The vehicle of claim 5, wherein the wheelchair seating area is between the body side and at least one of the first track and the second track.

8. The vehicle of claim 3, wherein the deployed position is positioned along one of the cross-vehicle portions of the first track and the second track.

9. The vehicle of claim 2, further comprising a wheelchair seating area, at least one of the first track and the second track extending around the wheelchair seating area on at least three sides of the wheelchair seating area.

10. The vehicle of claim 9, wherein the airbag is between the support member and the wheelchair seating area in the inflated position.

11. The vehicle of claim 9, wherein the airbag inflates away from the support member and toward the wheelchair seating area to the inflated position.

12. The vehicle of claim 2, wherein the tether is slidable along one of the first track and the second track as the post slides along the other of the first track and the second track.

13. The vehicle of claim 1, wherein the tether and the post are elongated along an axis from the vehicle roof to the vehicle floor, the support member is between the tether and the post along the axis.

14. The vehicle of claim 1, wherein the tether is slidable along one of the vehicle floor and the vehicle roof as the post slides along the other of the vehicle floor and the vehicle roof.

15. The vehicle of claim 1, wherein the post is slidable along a cross-vehicle axis and along a vehicle-longitudinal axis from the stowed position to the deployed position.

16. The vehicle of claim 1, wherein the deployed position is spaced from the stowed position along a vehicle-longitudinal axis.

17. The vehicle of claim 1, wherein the deployed position is spaced vehicle-inboard from the stowed position along a cross-vehicle axis.

18. The vehicle of claim 1, wherein the post is slidable from the deployed position to a second deployed position spaced from the deployed position along the vehicle floor.

19. The vehicle of claim 18, further comprising a computer including a processor and a memory storing instructions executable by the processor to:
   identify the presence of a wheelchair;
   identify whether the wheelchair is forward-facing; and
   based on identification of the wheelchair being forward-facing, move the post to the deployed position.

20. The vehicle of claim 19, wherein the processor stores instructions executable by the processor to:
   identify whether the wheelchair is rearward-facing; and
   based on identification of the wheelchair being rearward-facing, move the post to the second deployed position.

* * * * *